INVENTORS
CEDOMIR M. SLIEPCEVICH &
HADI T. HASHEMI
BY
Dunlap and Laney
ATTORNEYS

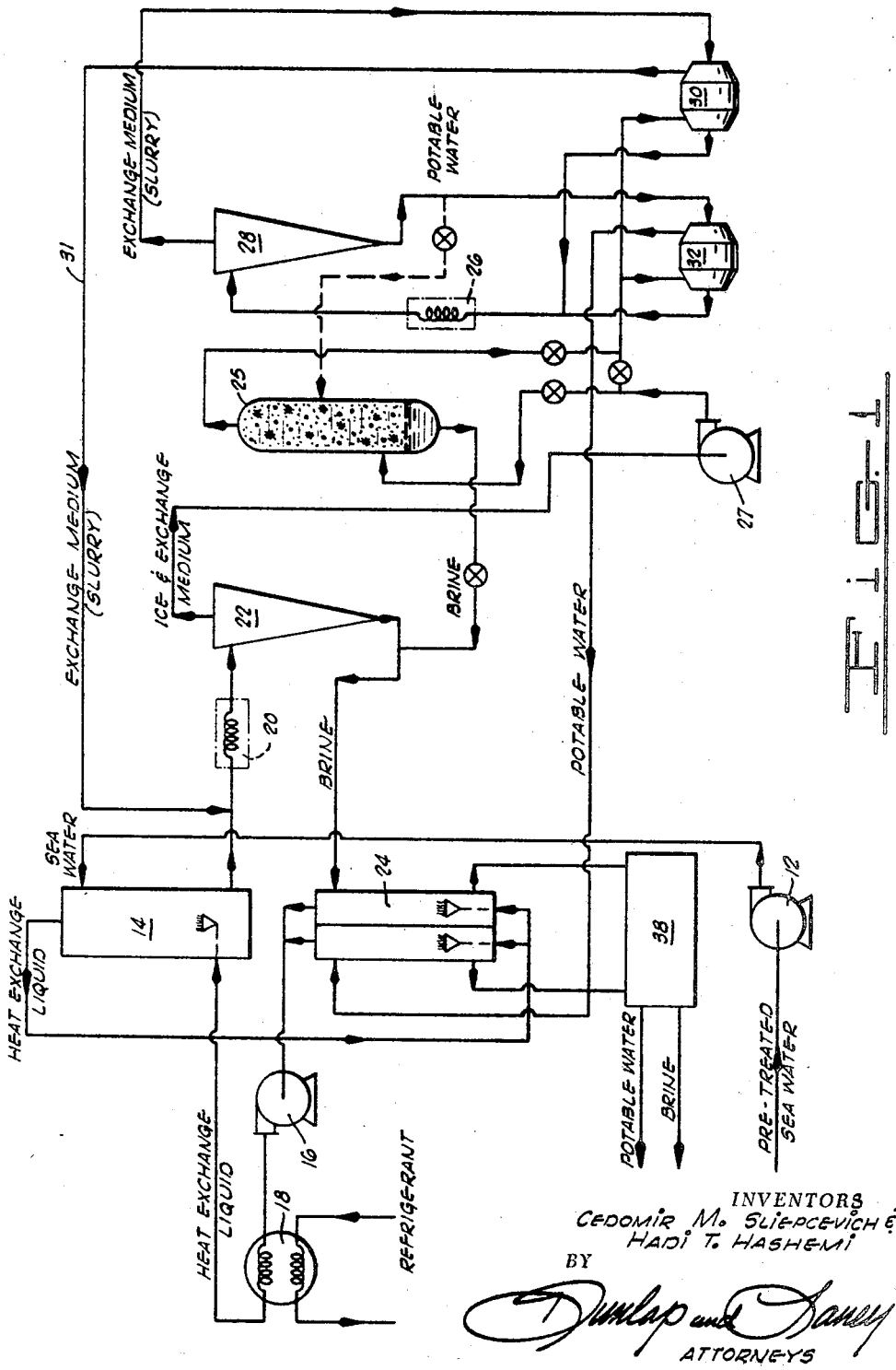

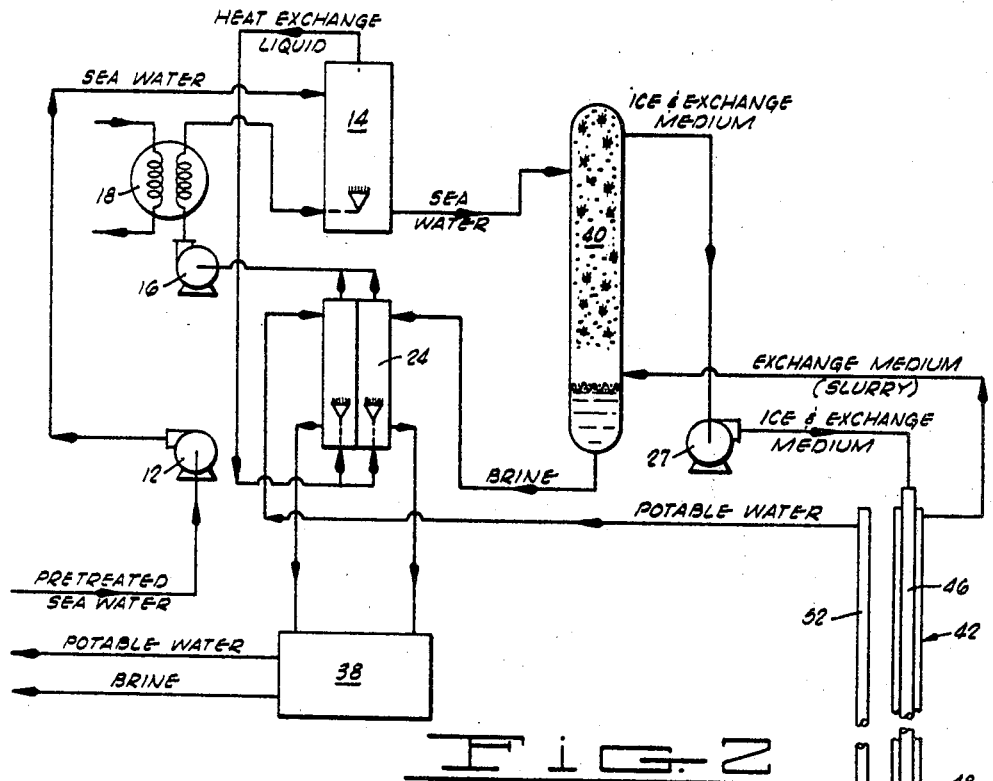
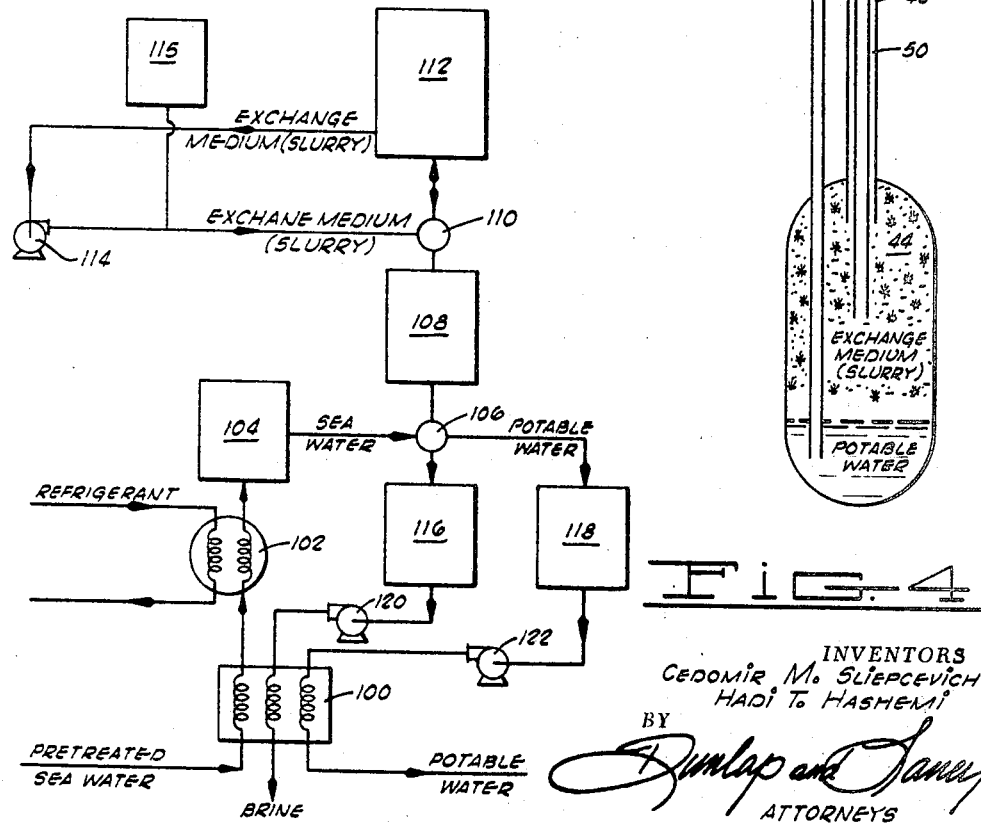

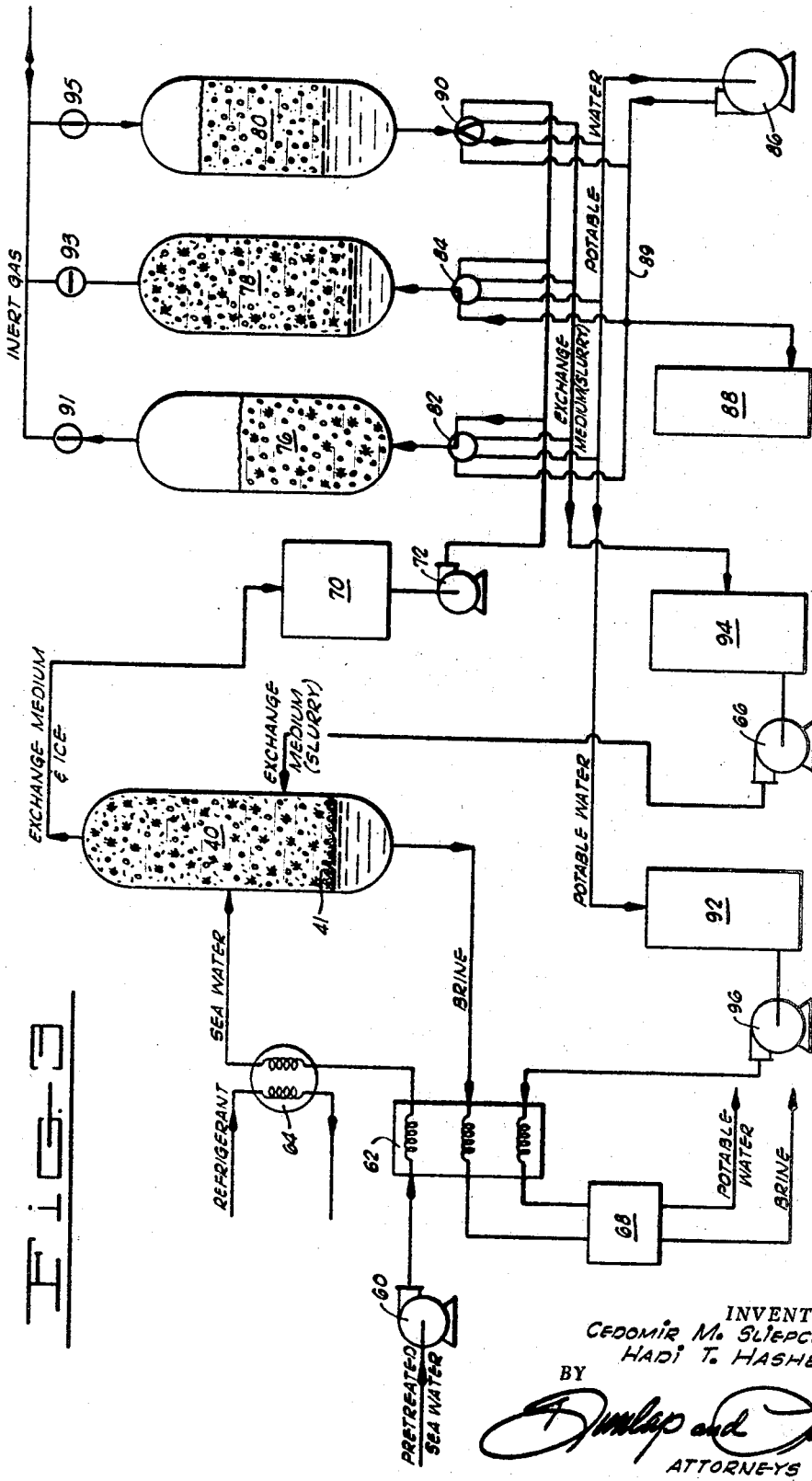

United States Patent Office 3,399,538
Patented Sept. 3, 1968

3,399,538
METHOD FOR SEPARATING RELATIVELY PURE WATER FROM AQUEOUS SOLUTIONS
Cedomir M. Sliepcevich and Hadi T. Hashemi, Norman, Okla., assignors, by direct and mesne assignments, of thirty-seven and one-half percent to University Engineers, Inc., Norman, Okla., a corporation of Oklahoma, and sixty-two and one-half percent to E-C Corporation, Wilmington, Del., a corporation of Delaware
Filed Nov. 26, 1965, Ser. No. 509,958
27 Claims. (Cl. 62—58)

The present invention relates to a method for treating aqueous solutions to remove fresh or relatively pure water therefrom, while simultaneously concentrating the solute in a portion of the aqueous solvent which remains. The method has particular usefulness in the recovery of potable water from saline water, such as sea water, or brackish water from natural subterranean reservoirs.

The problem of more economically recovering large quantities of potable water from sea water has captured the attention of many workers in recent years. In any of the present processes for recovering fresh water from sea water, the two major factors of concern in evaluating the feasibility of the process and its advantages relative to other desalinization methods are the capital investment required in the initial installation of the required apparatus, and the overall continuing operating costs. Capital investment costs are prohibitive in the case of some of the processes which are most economical from the standpoint of operating costs when the particular need for fresh water at this time is considered. One of the more promising general routes for the recovery of fresh water from saline solutions has entailed freezing the aqueous solution so as to produce ice, then bulk separating the ice from the brine from which it is derived, and finally, washing the ice crystals or particles to remove the occluded brine.

The present invention provides an improved process for recovering fresh water from sea water in a more economic manner, capable of achieving, in a preferred embodiment of the process, a production cost lower than conventional processes. The process includes operational steps which cumulatively require a minimum expenditure of energy for the recovery of a given amount of fresh water. The capital investment costs for installing the equipment necessary to the carrying out of the process are lower than competitive processes.

The economic advantages of our process are achieved in part by relying upon a relatively unique property of water, i.e., the fact that the freezing point of water decreases with an increase in pressure, whereas all other substances except a few metals show an increase in freezing point with an increase in pressure. This property permits, by an exchange crystallization process, the ice crystals to be reconverted to water more economically while simultaneously regenerating a slurry-type refrigerant used in the ice-freezing step. The economic advantages of the process are also realized in part due to the method by which the ice crystals are scrubbed or cleaned to remove occluded brine therefrom.

Broadly described, and as applied in general to aqueous solutions, including saline solutions, the process of the invention comprises the steps of initially freezing ice crystals from the aqueous solution, and simultaneously or subsequently directly and intimately contacting the aqueous solution and ice crystals with a liquid exchange medium having certain critical properties. These properties are immiscibility in the aqueous solution and in fresh water; stability in the presence of, and unreactive with, water and the solute of the aqueous solution to the extent that no irreversible physical or chemical transformations occur during said direct, intimate contact; a density less than those of the aqueous solution and of fresh water, and preferably such that it can maintain the ice in slurry form; a melting point at least as low as the freezing point of water at the pressure at which said direct, intimate contact occurs; and a freezing temperature which increases with pressure. It is further desirable, though not necessary, that the liquid exchange medium have a substantially lower surface tension than the aqueous solution from which the fresh water is to be recovered, and that the rate of change of melting temperature with pressure (designated as a coefficient, $\alpha$) not only be positive, but also relatively large. This assures that the application of relatively small amounts of pressure will effect a substantial shift in the freezing point of the exchange medium.

After contacting the aqueous solution with the exchange medium, these materials are separated from each other by utilization of the density difference which exists between the exchange medium and the aqueous solution. Thus, by virtue of the lesser density of the exchange medium as compared to the aqueous solution, the exchange medium will accumulate or stratify on top of the aqueous solution in a settling tank or, alternatively, can be separated in a cyclone or centrifuge. If the density of the exchange medium is at least equal to that of ice, the ice will be physically extracted from the aqueous solution and will either be suspended in, or will float to the top of, the exchange medium. When the density of the exchange liquid is not appreciably less than that of the ice particles, and the ice particles are relatively small, the exchange liquid keeps the ice in suspension for a period of time appreciably longer than that needed to separate the brine. A third possibility is the case in which the exchange liquid has a low density such that it will not maintain the ice in suspension under gravity. In this case the ice can be maintained in the exchange liquid phase by means of a screen located above the interface between the exchange liquid and brine.

Following removal of the aqueous solution from the exchange medium carrying the ice, the pressure is increased on the exchange medium and ice crystals so as to convert the ice crystals to fresh water and convert a portion of the exchange medium to solid particles. It is at this point that the characteristic of water of developing a lower freezing point upon application of pressure plays an important role. Thus, with the application of pressure to the system, the freezing point of the water is lowered. Simultaneously, the freezing point of the exchange medium is increased by virtue of the positive $\alpha$ (coefficient of freezing temperature versus pressure). As the exchange medium is converted to solid particles, it transfers its latent heat of fusion to the ice which causes it to melt.

As a final step in the process, the fresh water is separated from the liquid and solid particles of the exchange medium by again relying upon the density difference which exists between the exchange medium and the fresh water. Thus, the separation can be effected in a settling chamber, or by a cyclone or centrifuge.

In a preferred embodiment of the invention which possesses several economic advantages over the other embodiments to be described, freezing of the ice crystals from the aqueous solution is effected by intimately mixing a slush or slurry of the exchange medium with the aqueous solution after it has been pre-cooled to near its freezing point. The slurry of exchange medium can most suitably be that which is developed by the exchange crystallization which occurs when the mixture of ice crystals and liquid exchange medium is subjected to an increase in pressure so as to melt the ice crystals and cause a portion of the exchange medium to be converted to the solid state. Where this source of the exchange medium slurry is employed, after the fresh water and exchange medium slurry so produced (by the pressure increase) have been separated from each other as hereinbefore described, the exchange medium slurry is then recycled to the point in the process where the pre-cooled aqueous solution enters the process and is ready to be frozen so as to yield the ice crystals.

It should be further pointed out that in the preferred practice of the invention, a substantial part of the energy input to the process which exceeds that required to accomplish all of the necessary changes in temperature, pressure and physical states of materials is recovered and lowers the net input of energy required to carry out the process. Thus, the cold aqueous solution which is separated from the exchange medium and ice crystals in the initially effected separation step is circulated in heat exchange relation with the crude incoming aqueous solution so as to lower the temperature of this solution preparatory to freezing the ice crystals therefrom. The same utilization can be made of the fresh water which is produced in the final separation step of the process, since this liquid is at a temperature very close to its freezing point at the time of its separation. In another instance of energy conservation, both the fresh water and the exchange medium slurry yielded as products of the last separation step of the process possess available energy as a result of the increase in the pressure applied to the system prior to effecting such separation, and at least a portion of this energy can be recovered by expanding the fresh water and the exchange medium slurry through suitable expanders to a lower pressure so as to reclaim a portion of the energy therein. This recovered energy may be used to aid in driving the pump which is required to increase the pressure on the ice crystals and liquid exchange medium for the purpose of converting these materials to a liquid and solid state, respectively.

Having concluded a summary of the major steps constituting the process of the invention, the objects of the invention may be described as including in part:

Providing an improved procedure for recovering fresh or potable water from an aqueous solution;

Providing a more economic method of recovering fresh or potable water from saline waters;

In existing processes for recovering fresh water from seat water by the technique of freezing ice crystals from the sea water, improving such processes by reducing the cost of washing the ice crystals free from occluded brine.

In addition to the foregoing described objects and advantages, additional objects and advantages will become apparent as the following detailed description of the invention is read in conjunction with the accompanying drawings which illustrate the invention.

In the drawings:

FIGURE 1 is a schematic flow diagram illustrating a preferred embodiment of the invention in which a continuous process for recovery of fresh water from an aqueous solution is utilized. In this preferred embodiment, exchange crystallization is employed both for the purpose of freezing ice from the aqueous solution and for the purpose of converting the ice to fresh water.

FIGURE 2 is a schematic flow diagram illustrating a different embodiment of the invention also involving a continuous process for the production of fresh water.

FIGURE 3 is a schematic flow diagram illustrating yet another embodiment of the invention in which the process is operated on a semi-continuous basis.

FIGURE 4 is a schematic flow diagram illustrating the invention as it is practiced by a batch process.

Figure 5:
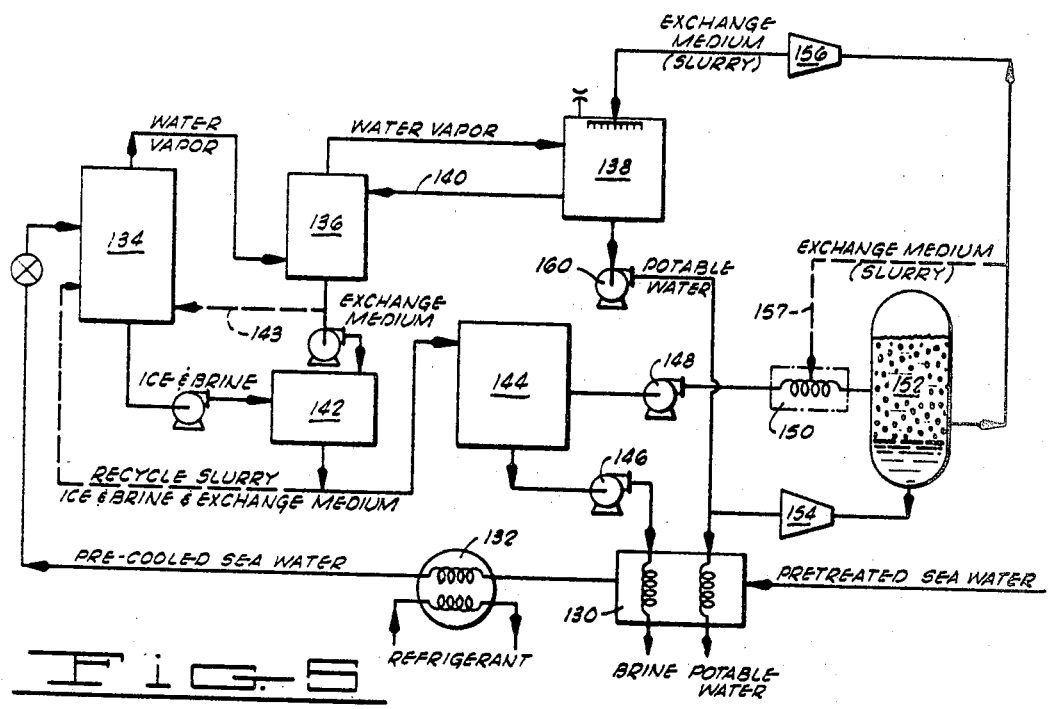
FIGURE 5 is a schematic flow diagram of a process for recovering fresh water from an aqueous solution in which exchange crystallization is utilized only for melting ice formed during the process.

By way of example, the description of the invention, as hereinafter set forth, will be directed to the employment of the invention in removing or isolating fresh or potable water from saline solutions, such as sea water or brackish water. It is to be clearly understood, however, that the principles of the process are applicable to the isolation of fresh water from other types of aqueous solutions, such as fruit juices and the like.

In FIGURE 1, a saline solution, such as sea water, is pumped by a suitable pump 12 into the system after it has been subjected to conventional pre-treatment of the type hereinbefore utilized in desalinization processes involving freezing. Such pre-treatment usually includes some type of filtration, precipitation and deaeration. One of the advantages of the present invention is that extensive deaeration of the sea water may not be necessary, since the presence of some dissolved gases in the water may assist in the production of finer ice crystals in the freezing step of the process which are desirable in some modifications of this process.

The pre-treated sea water is pumped to the top of a direct contact pre-cooling chamber 14. In the pre-cooling chamber 14, the sea water contacts, by counter-current flow, a heat exchange liquid, as is conventional in direct contact heat exchange. The heat exchange liquid is immiscible with the sea water. It also has a density sufficiently different from sea water to facilitate separation, and a freezing point below −5° C. One example is normal octane. Due to density difference, the sea water separates and accumulates at the bottom of the direct contact pre-cooler chamber 14, and the heat exchange liquid rises to the top of the chamber. Prior to its introduction to the direct contact pre-cooler chamber 14, the heat exchange liquid is pumped by a suitable pump 16 through an indirect makeup refrigeration unit 18 where the temperature of the heat exchange liquid is reduced to about the inital freezing point of the aqueous solution which in the case of sea water will usually be around −2° C.

It is to be clearly understood that the term "heat exchange liquid" as used herein refers solely to a liquid material used to effect pre-cooling of the sea water, and the term is not to be confused with the terms "exchange medium" or "liquid phase of the exchange medium." The two materials can be of entirely different character, and are employed at two different points in the process for different functions.

The sea water which is cooled in the direct contact pre-cooler chamber 14 leaves the bottom of this chamber at a temperature near its initial freezing point and is merged with an exchange medium (which is separate and distinct from the heat exchange liquid in units 18 and 24) prior to entering a crystallization zone 20. The exchange medium is in the form of a slush or slurry consisting of a frozen substance suspended in its own mother liquor and at its equilibrium melting temperature, preferably at one atmosphere pressure, which is lower by at least 0.5° C. than the corresponding freezing point range of the aqueous solution. The heat exchange slush may consist of a pure substance, or it may be a eutectic of two or more substances, which eutectic has a distinct melting point or which, because of the presence of certain impurities, melts over a range of not more than 2 or 3 degrees. Additionally, the pure material or eutectic should have certain additional properties which are important to the proper carrying out of the process of the invention.

First, the exchange medium, whether eutectic or pure material, should be immiscible in the sea water and also in fresh water. Preferably, the extent of immiscibility is such that the solubilities of either the solid or the liquid phase of the exchange medium in the sea water and in fresh water are less than 1 percent. Likewise, the solubilities of sea water and fresh water in the liquid and solid phases of the exchange medium are less than 1 percent.

In addition to the property of immiscibility, the exchange medium in both the liquid and solid phases, should be stable in the presence of, and unreactive with, water and with the solute of the aqueous solution (salt in the case of sea water) to the extent that no irreversible physical or chemical transformations occur during said direct, intimate contact.

Another critical property of the exchange medium slurry is that the liquid phase of the exchange medium has a density which is less that that of the aqueous solution and also less than that of fresh water. It is this density difference, coupled with the immiscibility characteristic of the exchange medium, which permits it to function in physically extracting or separating the ice crystals from the brine or concentrated aqueous solution, and which subsequently in the process, permits the fresh water to be separated from the exchange medium. Although the density of the exchange medium may range from as low as 0.5 gram/cc. (which density can be utilized when the water is frozen from the aqueous solution in an aerated condition so as to form snow-like crystals or flakes) to a density of about 1.02 grams/cc. in the case of relatively concentrated brine, preferably, the density of the exchange medium ranges from about 0.7 gram/cc. to about 0.95 gram/cc. Ideally, the density of the exchange medium should approach the "effective" density of the ice which will be formed in the ice crystallization zone 20, as hereinafter explained, so as to maintain a slurry which does not deposit ice in the transfer lines, pumps, expanders, or vessels.

Another property which must be possessed by the exchange medium is a freezing point which is at least as low as the freezing point of the sea water (or other aqueous solution subjected to the process) at the pressure at which the initial exchange crystallization procedure hereinafter described is carried out. In this initial exchange crystallization procedure which takes place in the ice crystallization zone 20, the system is preferably operated at atmospheric pressure, and the freezing point of the exchange medium is preferably in the range of from 0° to −10° C. The optimum temperature range, when all economic factors are considered, will most frequently fall between the −2° and −6° C. when treating sea water.

As a final property which must characterize the exchange medium, it must have a freezing point which increases with an increase in the pressure applied to the material. In order to provide a better understanding of this property, a term $\alpha$, which will be called the coefficient of rate of change of melting temperature with pressure will be utilized. It will be perceived that for an increase in temperature to occur upon an increase in pressure, $\alpha$ must be a positive value. Thus, the materials used as the exchange medium in the present invention must be characterized in having a positive $\alpha$.

Some further consideration of the coefficient of freezing temperature versus pressure, $\alpha$, will be helpful in understanding the invention. This coefficient may be further defined as follows:

$$\alpha = \frac{dT}{dP} = \frac{T \Delta V}{\Delta H} \quad (1)$$

where $\Delta V$ = specific volume of solid minus specific volume of liquid $\Delta H$ = enthalpy of solid minus enthalpy of liquid = latent heat of fusion $T$ = melting temperature on the absolute scale at the corresponding pressure In the practice of the present invention, T in Equation 1 may be considered as substantially constant, and may be considered as approaching 273° K. for the cases of interest. Therefore, a higher value of $\alpha$ is favored by a high value of $\Delta V$ and a low value of $\Delta H$. A low $\Delta H$ material requires a higher recirculation rate of the exchange medium as hereinafter described. On the other hand, a high value of $\alpha$ favors a reduction of the pressure level required in the process. Thus, it can be readily seen that these several parameters have to be optimized and balanced for the achievement of maximum economy. Thus, the optimum $\alpha$ will vary with the particular exchange medium utilized, the particular physical plant in use, the flow rates employed, etc. In general, the maximum value of $\alpha$ which can be obtained is desirable, and the minimum value of $\alpha$ which can suitably characterize the exchange media employed in the process of this invention in about 0.015° C./atmospere. It is further preferable that the latent heat of fusion ($\Delta H$) for the exchange medium be from about −25 to about −60 calories/gram, and the $\Delta V$ be from about −0.10 to −0.15 cc./gram. By way of comparison, the corresponding values for water are $\alpha = -0.0075°$ C./atmosphere, $\Delta H = -80$ calories/gram and $\Delta A = 0.09$ cc./gram.

Certain other properties desirably characterize the exchange medium, though they are not critical or essential to the operativeness of the invention. Thus, if the fresh water recovered in the process is to be used for domestic consumption by humans (as opposed to, say, irrigation), the exchange medium should be a nontoxic material, at least to the levels to which it can be economically removed from the fresh water final product.

The critical and desirable characteristics of the exchange medium severely limit the number of pure substances which can be utilized as this material in the practice of the invention, and when economic factors are considered, it is presently believed that no more than 40 materials, other than eutectic mixtures, can suitably be utilized. Several general categories of suitable materials may be cited as a further aid in understanding the invention, although it is to be understood that all of the specific materials which might fall within these general categories do not meet the requirements of the exchange medium as hereinbefore set forth, and it is also to be understood that the listed groups of materials are not intended to be an exclusive and comprehensive statement of all materials or categories of materials which can be effectively used as the exchange medium. It is believed certain, however, that having been informed of the critical and desirable properties which should characterize the exchange medium, one skilled in the art can easily verify by routine experimentation, the suitability of various substances not specifically mentioned herein.

We have found that certain esters of fatty acids of the type constituting oils, fats and waxes possess the properties desired in the exchange medium. Particularly suitable are animal (especially marine) and vegetable oils which do not undergo irreversible crystalline transformation when used in the process. Such oils include cod liver oil, menhaden oil, dolphin oil, sesame oil, whale oil, castor oil, olive oil, white mustard seed oil, and triolein.

Certain long, straight chain organic compounds containing 6 or more carbon atoms are suitable. Examples of this type of materials include dodecane, dodecyne, tridecane, 1,5 hexadiyne, 1-menthone and 1-nonanol.

Ketones, such as dibutyl ketone and methyl heptyl ketone, are satisfactory, as are certain amines, such as butanolamine and p-aminoethylbenzene.

Suitable cyclic and aromatic organic compounds include tetramethylbenzene, methylcyclohexanol and indene. Certain organic acids, such as linoleic and caproic acids, also are suitable.

Appropriate mixtures of these exemplary materials can, of course, also be utilized.

Finally, an important category of substances which can be used as the exchange medium employed in the invention are eutectic mixtures of two or more relatively pure materials. The eutectic mixtures provide the possibility of synthesizing an exchange medium having a more optimum combination of properties than can be obtained with most pure compounds. Specific examples of such eutectic mixtures are benzene and naphthalene, cyclohexane and naphthalene, pentadecane and benzene.

The exchange medium slurry and the pre-cooled sea water are directly and intimately mixed or contacted in the ice cystallization zone 20. Mixing can be accomplished by turbulent flow in a pipe section, in an agitated vessel, using liquid jets or using a recirculation tower. During this intimate mixing, the solid particles in the exchange medium slurry melt and absorb their latent heat of fusion. This lowers the temperature of the sea water-exchange medium slurry and causes water to freeze from the sea water to form ice particles or crystals. The occurrence of this change of state in both the sea water and in the exchange medium slurry we have termed "exchange crystallization," and this phenomena occurs at two different points in the process of the invention as it is carried out in the preferred manner represented by the flow diagham in FIGURE 1.

After the occurrence of exchange crystallization in the ice crystallization zone 20, separation of the ice and exchange medium from the brine occurs as a result of density differences, and can be effected in several ways. In FIGURE 1 of the drawings, a cyclone separator 22 is depicted as receiving the brine-exchange medium mixture from the ice crystallization zone 20.

It should be interjected at this point that as the ice crystals which are formed in the crystallization zone 20 become surrounded by the exchange medium liquid, the ice crystals are scrubbed by the exchange medium liquid. In many cases where the ice is less dense than the exchange medium liquid, it rises to the top of the exchange medium liquid and is scrubbed during the passage through the body of the liquid. It is desirable to freeze the water from the brine as rapidly as possible in order to promote smaller ice crystals which, unlike other freezing processes, are preferred in the present invention in order to maximize the interfacial area available for heat transfer. On the other hand, larger ice crystals will tend to occlude less brine. Therefore, an optimum crystal size will exist.

In the cyclone separator 22, the exchange medium is separated from the brine. The brine, which is of greater density than the exchange liquid, is moved to the bottom of the separator 22, and is transmitted therefrom through a suitable conduit to one side of a compartmented pre-cooler 24. The function of the compartmented pre-cooler 24 will be hereinafter explained in greater detail. The slurry of ice and the liquid exchange medium is withdrawn from the top of the cyclone separator 22 and passes through an intermediate pump 27 which is driven by external power, such as electricity, steam, or a gas engine. If desired, though not shown in FIGURE 1, a portion of the ice-exchange medium slurry can be recycled to the ice crystallization zone 20 to promote nucleation of ice particles.

The principal function of the pump 27 is to raise the pressure on the slurry of ice and exchange medium to some intermediate level, about 10 to 100 atmospheres as required to make up the deficiency in pressure energy which is subsequently recoverable from the dual, pump-expander units, 30 and 32, to be described later. As an incidental result of this first stage of pressurization by pump 27, preparatory to the final stage of pressurization in units 30 or 32, the slurry of ice and exchange medium will become more compacted and a very small fraction of the ice, confined to the surface layers of the ice crystals, will melt. The combined action of compaction and melting will disengage the remnants of brine occluded to the ice crystals, which was not removed completely from the action of unit 22.

The compacted ice and slurry, containing residual amounts of brine, then passes to a wash tower 25 where the brine is separated from the ice and slurry and rejected from the processes through pre-cooler 24. The completeness of separation in 25 can be—if very high purity product is desired—facilitated by introducing a small quantity of product water produced in unit 28—to be described later—into the upper part of wash tower 25. As this wash water gravitates to the bottom of the wash tower it serves to scrub the rising slurry of ice and exchange medium, thereby freeing it of residual brine. The washed slurry of ice and exchange liquid leaving the top of wash tower 25 is then split into two streams for final pressurization in the dual, pump-expander units 30 and 32. It should be noted that the discharge from intermediate pump 27 can be diverted all or in part, depending on the final product purity desired, to the dual pump-expander units 30 and 32 so as to by-pass wash tower 25 to the extent desired.

The extent to which the pressure is increased in the dual, pump-expander units 30 and 32 will depend upon the exchange medium and its particular properties. A pressure of between 50 and 200 atmospheres can usually be successfully employed in the desalinzation of sea water where the initial exchange crystallization used to effect the formation of ice crystals is carried out at atmospheric pressure.

The pressure level P, which must be introduced by the dual pump-expander assembly units 30 and 32, in order to effect exchange crystallization can be estimated in the following manner. Let $T_{em}$ represent the freezing point of the exchange medium at substantially one atmosphere pressure. It then follows from Equation 1, given the value of $\alpha$ for water = $-0.0075$, that if $$-0.0075\ P < \alpha_{em} P + T_{em} \tag{2}$$

then the ice will melt and the exchange medium will freeze under a pressure P. Equation 2 can be converted to an equality in the following manner, $$-0.0075\ P + \Delta = \alpha_{em} P + T_{em} \tag{3}$$

where $\Delta$ is the difference in freezing point of water and of the exchange medium which represents the economical temperature approach (defined as a positive number) in the high pressure, direct contact reverse exchange crystallization zone 26 in which the ice is melted and the exchange medium slurry is formed. Thus, the operating pressure can be estimated by $$P = \frac{T_{em}}{-0.0075 - \alpha_{em}} - \frac{\Delta}{-0.0075 - \alpha_{em}} \tag{4}$$

As further illustrative of the manner in which the high pressure exchange crystallization is carried out, several examples may be cited.

*Example 1*

The volumetric capacity and flow rate parameters of a given system indicate that the high pressure exchange crystallization can be most economically carried out at a freezing point differential $\Delta$ of 0.5° C. Cod liver oil is used as the exchange medium and has a freezing point at atmospheric pressure, $T_{em}$, of $-3$° C. and an $\alpha_{em}$ of 0.02. Substituting these values in Equation 4, it can be calculated that a pressure of 127 atmospheres must be applied to the mixture of ice and exchange medium in order to achieve the desired 0.5° C. freezing point differential and effect exchange crystallization to yield fresh water and exchange medium slurry at the desired rate.

Example 2

If, instead of using cod liver oil as in Example 1, a eutectic mixture of benzene and naphthalene is utilized as the exchange medium, this material has a freezing point, $T_{em}$, at atmospheric pressure of $-3.6°$ C., and an $\alpha_{em}$ of 0.03. The pressure required to develop the desired $0.5°$ C. freezing point differential is thus calculated to be 109 atmospheres.

Example 3

Where the exchange medium utilized is a eutectic mixture of cyclohexane and naphthalene, the eutectic has a freezing point at atmospheric pressure of $-3.6°$ C. and an $\alpha_{em}$ of 0.05. The pressure required for a $0.5°$ C. freezing point differential is therefore 71 atmospheres.

Example 4

At atmospheric pressure, the freezing point of a eutectic mixture of pentadecane and benzene is $-4.5°$ C. The $\alpha_{em}$ of the eutectic is 0.025. The pressure to attain a $\Delta$ of $0.5°$ C. is therefore 153 atmospheres.

Example 5

Normal tridecane has a freezing point at atmospheric pressure of $-5.4°$ C. Its freezing point versus pressure coefficient $\alpha_{em}$ is 0.02. It meets the other required properties which must characterize the exchange medium and can be utilized to freeze out effectively about 60 weight percent of the water when a pressure of 214 atmospheres is utilized to effect exchange crystallization at a freezing point differential of $0.5°$ C.

It should be noted that the exchange crystallization process which occurs in the high pressure exchange crystallization zone 26 as a result of the increase of pressure on the system is the same as that which occurs in the ice crystallization zone 20 except that the reverse process occurs, i.e., the ice melts and a portion of the exchange medium freezes and is thus converted to the solid state.

From the high pressure exchange crystallization zone 26, the mixture of water and exchange medium, which now includes a liquid and solid phase, is passed to a cyclone separator 28. Instead of the cyclone separator, a settling tower or centifuge can be utilized to effect separation of the water from the exchange medium on the basis of density difference. The exchange liquid slurry is removed from the top of the cyclone separator 28 and, while still under superatmospheric pressure, is passed to one of the units 30 of a dual pump-expander assembly. In passing through the pump-expander unit 30, the exchange medium slurry expands to approximately one atmosphere, and its equilibrium melting temperature drops to from about $-2.5°$ C. to about $-4.5°$ C. (in the case of sea water desalination) depending upon the particular exchange medium utilized. At the same time, a major portion of the energy yielded up by the exchange medium as it is expanded to a reduced pressure is delivered by the other end of the pump-expander unit 30 to the mixture of ice crystals and exchange medium being pumped to the high pressure exchange crystallization zone 26. Thus the required net power input to attain the desired pressure level is reduced.

From the pump-expander unit 30, the exchange medium slurry is recycled via the line 31 to the point where it is introduced into the pre-cooled sea water moving from the direct contact pre-cooler chamber 14 to the ice crystallization zone 20. Although not shown in the flow diagram of FIGURE 1, part of the exchange medium slurry can be recycled to the high pressure exchange crystallization zone 26 to promote nucleation of the solid particles of the exchange medium therein if this should be desirable.

The potable or fresh water which is separated from the exchange medium slurry in the cyclone 28 is removed from the bottom of the cyclone and is passed through a second pump-expander unit 32 and is there expanded down to about one atmosphere pressure. The recovered energy resulting from such expansion is also utilized to aid in increasing to the desired level the pressure on the ice-exchange medium mixture entering 26. After passing through the pump-expander unit 32, the cold fresh water is directed to the top of the opposite side of the compartmented, direct contact pre-cooler 24 from the side into which the cold brine from the cyclone separator 22 is directed. It will be apparent that the construction of the compartmented, direct contact pre-cooler 24 is such that the fresh water and brine entering opposite sides thereof are not allowed to come in contact with each other. Both the water and the brine flow downwardly in their respective chambers in countercurrent flow to a rising stream of a heat exchange liquid which is recovered from the top of the direct contact pre-cooler chamber 14 as hereinbefore described. The heat exchange liquid is introduced in two separate streams to the bottoms of the two compartments of the compartmented, direct contact pre-cooler 24. Since the heat exchange liquid is less dense than either the fresh water or the brine, it moves to the top of the compartmented pre-cooler 24 and is pumped from the pre-cooler by pump 16 through the makeup refrigeration unit 18. The purpose of the makeup refrigeration unit 18 is to permit heat losses in the heat exchange liquid to be made up so that it enters the direct contact pre-cooler chamber 14 at the desired temperature, which in the case of a sea water desalination plant will be about $-2.5°$ C.

The fresh water and sea water are each removed from the bottom of their respective compartments of the compartmented pre-cooler 24 and are directed through a purifier 38, such as an absorbent bed or filter, to remove unacceptable traces of the exchange media which may be entrained in the fresh water and brine. In the case of the brine, of course, scrubbing or recovery of the exchange medium is more for the purpose of conservation of this material than it is for the purpose of purifying the brine.

A modified embodiment of the process of the invention is illustrated in FIGURE 2 of the drawings. Since the apparatus utilized in carrying out the modified process is quite similar, in many respects, to that which has been depicted in FIGURE 1 and described in referring thereto, identical reference numerals have been utilized in the identification of duplicate or identical apparatus in the two figures. The process as carried out using the system depicted schematically in FIGURE 2 proceeds in the same manner as has been described in referring to FIGURE 1 until the pre-cooled sea water is withdrawn from the bottom of the direct contact pre-cooler chamber 14. Then, instead of being passed into an ice crystallization zone and a cyclone separator as described in referring to FIGURE 1, the sea water is directed into a single exchange crystallization and separation tower 40 where ice crystals are frozen from the sea water while the solid particles in the exchange medium slurry melt. Stratification within the tower 40 occurs so that the brine settles to the bottom of the tower and the ice crystal-exchange medium mixture moves to the top of the tower. A suitable screen 41 can be extended transversely across the tower 40 above the interface between the brine and the exchange medium in the top of the tower to prevent any of the ice crystals from gravitating downwardly and being carried out with the brine. It will be noted that the exchange medium is introduced at a point in the tower 40 which is a short distance above the screen, and as it rises upwardly and the solid particles therein concurrently melt, it suspends the ice crystals which are formed from the countercurrently moving brine. The slurry of ice crystals and exchange medium is removed from the top of the tower 40 while the brine is discharged from the bottom thereof.

In the embodiment of the invention schematically depicted in FIGURE 2, the high capital and power costs which are required to provide a pump for effecting the total increase in pressure necessary to the last exchange crystallization step of the process is circumvented by using hydrostatic head and the consequent natural increase in pressure at increasing depths in the earth to secure pressurization of the system. For this purpose, advantage may be taken of existing mine shafts, underground cavities or abandoned wells. Alternatively, under favorable conditions, a well may be drilled to a depth corresponding to the required pressure of from about 50 to about 250 atmospheres. The well is designated generally by reference character 42 in FIGURE 2 and enters a cavity 44 located at the proper depth in the earth. It will be noted that the well 42 includes an internal tubing string 46 and an external tubing string 48 which defines an annulus 50 with the internal tubing string. There is additionally provided a tubing string 52 which is utilized to deliver fresh or potable water from the bottom of the cavity 44 to the surface, as hereinafter described.

Where the hydrostatic pressure of the column of liquid is utilized in the process of the invention to effect the high pressure exchange crystallization step of the process, the pump 27 functions only as a transfer pump and need deliver power only sufficient to compensate for friction losses in the flow lines and hydrostatic pressure differences due to density differences. In this case, no high pressure pumping units, such as the dual, pump-expander assembly 30 and 32 of FIGURE 1, are required. The slurry of ice and exchange medium passes from the tower 40 in which the low pressure exchange crystallization occurs through the pump 27 and enters the underground cavity 44 through the internal tubing string 46. Alternatively, where high product purity is desired, a wash tower (not shown) similar to 25 in FIGURE 1 can be interposed between pump 27 and the tubing string 46.

The slurry is pressurized due to the existence of the hydrostatic head standing in the tubing string 46. The hydrostatic pressurization in 46 serves the same purpose as the pump-expanders 30 and 32 in FIGURE 1 to achieve exchange crystallization of the type hereinbefore described, in which a portion of the exchange liquid freezes to regenerate the exchange medium slurry, and the ice crystals melt. This transformation of physical states is completed in the upper portion of the cavity 44. Separation of the liquid phases occurs in the cavity as a result of the density difference hereinbefore described so that the potable water collects in the bottom of the cavity. The exchange medium slurry which is regenerated as a result of the pressure increase passes upwardly in the annulus 50 and is sent back to the low pressure exchange crystallization zone in the tower 40.

Fresh or potable water from the bottom of the cavity 44 is delivered through the tubing string 52 to the surface of the ground, and from this tubing string it is passed to the partitioned pre-cooler 24 for the purpose hereinbefore described in referring to this unit in FIGURE 1. Finally, both brine and the fresh water are passed through the purifier 38 prior to ultimate recovery.

In the modified embodiment of the invention illustrated in FIGURE 3, the method used to pre-cool the sea water is a conventional, indirect heat exchanger rather than the direct heat exchange procedure for cooling illustrated in FIGURES 1 and 2. (Direct heat exchange of the type shown in FIGURE 1 could also be used if desired.) Thus, the incoming sea water is passed by a pump 60 through a heat exchanger 62 in indirect heat exchange with cold brine and potable water derived from the process in the manner hereinbefore described. After passing through a refrigeration makeup heat exchanger 64, the cold sea water enters a tower 40 which is substantially identical in its function and operation to the tower 40 illustrated in FIGURE 2. Thus, the exchange crystallization process is caused to occur in the tower 40 by mixing the sea water with the exchange medium which is in the form of a slurry delivered to the tower from a pump 66 at a temperature just below the freezing point of sea water. The function of the pump 66 in recirculating the exchange medium slurry to the tower 40 will be hereinafter explained in greater detail.

Cold brine is withdrawn from the bottom of the tower 40 after separation by density difference has occurred, and is passed through the direct heat exchanger 62 and the purifier 68. The exchange medium and entrained ice are removed from the top of the tower 40. The mixture of ice and exchange medium are directed into a surge tank 70. A pump 72 is employed to deliver the mixture of ice and the exchange medium accumulated in the surge tank 70 to one of three high pressure exchange crystallization towers designated by reference characters 76, 78 and 80.

The three high pressure exchange crystallization towers 76, 78 and 80 permit the process to be operated in a semi-continuous fashion by methods well understood in the art. Thus, as is illustrated in FIGURE 3, ice crystals and exchange medium are directed into the chamber 76 through a four-way valve 82 so that this one of the three chambers is in the process of being filled with the mixture of ice and exchange medium. The second tower 78 has been completely filled with the ice-exchange medium mixture, the valve 93 has been closed and the valve 84 has been turned to a second position so as to permit the mixture in the tank to be pressurized by means of a pressurizing pump 86. It will be noted that a high pressure water surge tank 88 is connected to the discharge of the pressurizing pump 86 in order to promote continuous operation of this pump in the semi-continuous operation of the system.

The third high pressure exchange crystallization tower 80 is shown as it is being used for the final separation of the fresh water from the exchange medium slurry. This step follows the pressurization step which causes the ice to be melted and accumulate in the bottom of the reservoir and effects the regeneration of solid particles in the exchange medium to produce the exchange medium slurry. It will be noted that an inert gas atmosphere is provided in the top of each of the high pressure exchange crystallization towers 76, 78 and 80 so that the draining of the third tower 80 can be expedited after the exchange crystallization has taken place.

It will be noted in referring to the valves 82, 84 and 90 that they can each be thrown to four alternate positions, in one of which, the fresh water which has stratified or accumulated in the bottom of any one of the towers 76, 78 or 80 can be directed to a potable water surge tank 92. After the fresh water has been drained from one of the towers, its valve is thrown to a second position so that the exchange medium slurry is directed to an exchange medium surge tank 94. As has been previously explained, the pump 66 pumps the exchange medium slurry from the exchange medium surge tank 94 to the low pressure crystallization tower 40 where the low pressure exchange crystallization hereinbefore described occurs. Fresh water from the fresh water surge tank 92 is delivered by a pump 96 to the direct heat exchanger 62 and thence to the purifier 68.

The manner in which a plurality of cyclically operated vessels are used in alternating sequence to achieve semi-continuous operation is well understood in the art. Where the semi-continuous embodiment of the present invention is utilized, the power requirements are considerably less than the power requirements for continuous process illustrated in FIGURE 1. On the other hand, substantially more high pressure equipment is required in the semi-continuous process than in the continuous process. For a given plant capacity, it is therefore necessary to balance the capital costs factor against operating cost.

For small capacity desalinization plants, the batch process schematically illustrated in FIGURE 4 is perhaps the most economical. In this process, conventionally pre-treated sea water is pumped through an indirect heat exchange pre-cooler 100 and a refrigeration makeup heat exchanger 102 to a sea water reservoir 104. Pre-cooled sea water from the reservoir 104 is directed through a three-way valve 106 to an exchange crystallization tower 108 where it is directly and intimately mixed with the exchange medium slurry. The exchange medium slurry is introduced to the top of the tower 108 via a valve 110 from an exchange medium storage tank 112 by means of gravity.

The exchange crystallization tower 108 is operated alternately at low and high pressure. Thus, after introduction of the pre-cooled sea water to the tower 108, the mixture of the sea water with the exchange medium slurry hereinbefore described is agitated for several minutes. In the course of the agitation and subsequently thereto, exchange crystallization occurs in which the ice crystals are frozen from the sea water and the solid particles in the exchange medium slurry are melted. Following agitation, the mixture in the tower 108 is permitted to become quiescent and is settled. Separation of the phases is then accomplished by density difference so that the brine accumulates in the bottom of the tower and can be drained therefrom through the three-way valve 106 to a brine reservoir 116; simultaneously exchange medium from 112 replaces the brine drained from 108. The valve 110 is then moved to a second position to place the pump 114 in communication with the tower 108 and the slurry of ice and exchange medium liquid which remains in the tower 108 is pressurized by the use of the pump 114 and agitation of the mixture is recommenced. A surge tank 115 is provided to smooth out the flow of exchange medium during the cycle of operation. High pressure exchange crystallization is thus caused to occur and the ice is melted while the exchange medium slurry is regenerated by the formation of solid particles therein. Agitation is stopped and the exchange medium slurry is allowed to separate from the fresh water. Three-way valve 110 is opened to reservoir 112, reducing the pressure in 108 to about one atmosphere. The fresh water which accumulates in the bottom of the tower 108 is quickly directed through the three-way valve 106 to a fresh water reservoir 118. Both the cold brine and the cold fresh water can be withdrawn by suitable pumps 120, 122 from their respective reservoirs 116 and 118 and passed in indirect heat exchange to the incoming pretreated sea water in the heat exchanger 100.

As the fresh water is drained from the exchange crystallization tower 108, the exchange medium slurry remaining therein undergoes a drop in freezing temperature as the pressure is lowered to about one atmosphere. The slurry is then ready to receive another batch of sea water from the sea water reservoir 104.

A well-known currently used process for the desalinization of sea water involves the flashing of pre-cooled sea water to a reduced pressure in order to yield water vapor and a mixture of sea water and ice. This process suffers principally from three cost disadvantages. These are (a) the cost of the large and bulky equipment required to condense the water vapor generated by the process which occupies an extremely large volume at the low pressures of production, (b) the requirement of large internal recycle rates in order to achieve large ice crystals to facilitate the handling and washing of the ice crystals, and (c) the net loss of water which results from the need to wash occluded brine from the ice crystals using fresh water for washing purposes.

The application of the hereinbefore described concept of exchange crystallization to certain aspects of the described freeze-evaporation or flashing technique minimizes the cost disadvantages described. The manner in which exchange crystallization can be advantageously utilized in conjunction with certain portions of the freeze-evaporation procedure is illustrated in FIGURE 5. At the commencement of the process, conventionally pretreated sea water is passed through an indirect heat exchanger 130 and a makeup refrigeration unit 132 to a freeze-evaporator unit 134. In the freeze-evaporator unit 134, the sea water is flashed to a pressure of 3 to 4 mm. Hg thereby reducing the temperature to −2 to −4° C., and the large volume of water vapor generated by the flashing of the sea water is taken overhead from the freeze-evaporator unit 134 and directed to a scrubber 136. Simultaneously with the production of the water vapor, ice is frozen from the cold sea water in the freeze-evaporator unit 134.

The vapor directed from the freeze-evaporator unit 134 to the scrubber 136 contains entrained brine. In order to remove the brine from the water vapor, exchange medium is directed from a condenser 138 (the function of which will be later explained) via a conduit 140 into the top of the scrubber 136. The exchange medium liquid flows countercurrent to the water vapor in the scrubber 136, and, after scrubbing entrained brine from the water vapor, is removed from the bottom of the scrubber and directed to a slurry chamber 142. If desired, a portion of the exchange medium can be passed into the freeze-evaporator unit 134 as shown by the dashed line 143 so that the ice crystals which are formed in the freeze-evaporator unit are formed in the presence of the exchange liquid with the result that brine occlusion in the ice crystals is reduced by the washing or scrubbing influence of the exchange medium liquid.

The mixture of sea water and ice crystals which are formed in the bottom of the freeze-evaporator unit 134 are withdrawn from this unit and are also passed into the slurry chamber 142. In the slurry chamber 142, the exchange medium is directly and intimately mixed with the mixture of ice and sea water so that the ice crystals are physically extracted from the brine (by density differences) and are scrubbed to remove occluded brine in the manner previously described herein.

The mixture of exchange medium, brine and ice crystals is then transferred to a settling tank 144 where the exchange liquid and ice crystals are separated by gravity from the heavier brine. A portion of this mixture can be recycled to the freeze-evaporator 134 where the ice crystals can promote nucleation and aid in the freezing out of additional water. The brine from the bottom of the settling tank 144 is pumped by a suitable pump 146 through the indirect heat exchanger 130 to pre-cool the sea water entering the process. The exchange medium containing entrained ice crystals is passed through a high pressure pump 148 to a high pressure exchange crystallization zone 150 in which the pressurized system undergoes a change in physical state such that the ice is melted and becomes fresh water, and the exchange medium is converted to a slurry containing solid particles. The fresh water and exchange medium slurry are then moved into the settling tank 152 where a separation of the fresh water on the basis of density difference is effected in the manner hereinbefore described. The fresh water is then passed through a suitable expander 154 which is utilized to recover a portion of the energy developed in the water during the pressurization step, and this energy is utilized to reduce the net input of energy required to carry out the process. The exchange medium slurry is likewise passed through an expander 156 prior to recycling the exchange medium to the condenser 8. If desired, a portion of the exchange medium can be recycled by a pump (not shown) to the high pressure crystallization zone 150, as illustrated by the dashed line 157 in FIGURE 5.

The condenser 138 makes use of the exchange medium to condense the water vapor entering the condenser from the scrubber 136. Though the exchange medium enters the condenser 138 at approximately atmospheric pressure and an equilibrium melting temperature of, say, about −4.5° C. (depending on the particular exchange medium used), the pressure and temperature in the condenser 138 are about 3 mm. Hg and about −4° C., respectively. When the water vapor contacts the exchange medium, it is condensed and, by virtue of its denser character than the exchange medium, accumulates in the bottom of the condenser 138. From the bottom of the condenser 138, the fresh water can be removed by a suitable pump 160 and conveyed to the indirect heat exchanger 130 for pre-cooling the incoming sea water. As previously pointed out, the exchange medium which stratifies on top of the fresh water in the condenser 138 is withdrawn therefrom by a suitable conduit 140 and passed to the scrubber 136.

It will be apparent to those skilled in the art that several alternatives or modifications to the process schematically portrayed in FIGURE 5 can be effected. Specifically, more exchange medium slurry than is required to condense the water vapor can be recirculated in the system. This "surplus" exchange medium leaving the condenser 138 and passing through the scrubber 136 to the slurry chamber 142 can then be utilized in a direct contact low pressure exchange crystallization process of the type hereinbefore described to freeze out more of the water from the brine in the slurry chamber 142, thus permitting a higher yield of ice without increasing the water vapor handling load. In fact, the water vapor load can actually be reduced (for the same production rate) by balancing the quantity of surplus exchange medium slurry used to generate additional ice in the slurry chamber 142 against the amount of vapor which can be handled economically in the condenser 138.

As a further variation of the procedure described in referring to FIGURE 5, the exchange medium slurry, instead of being fed to the top of the condenser 138 as depicted in FIGURE 5, can be passed directly into the top of the freeze-evaporator unit 134 so as to liquefy the water vapor yielded by this unit in situ in the freeze-evaporator and thereby eliminate the need for the scrubber 136 and condenser 138, both of which represent a considerable capital investment. In this arrangement, the total fresh water product would be derived from the settling tank 152.

Figure 6:
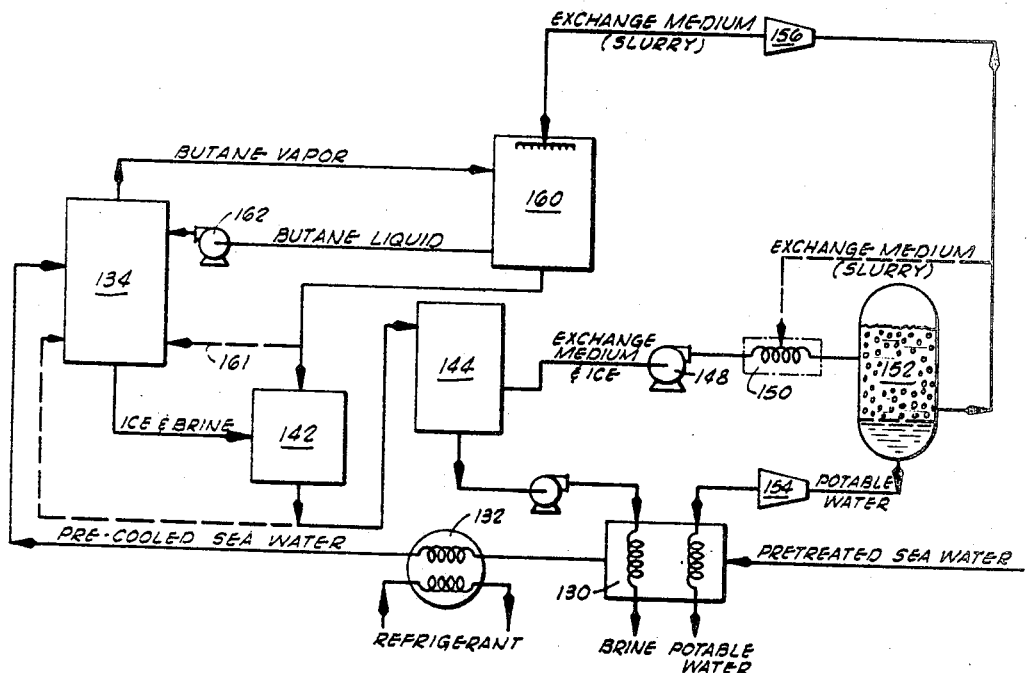
FIGURE 6 is a schematic flow diagram generally similar to FIGURE 5, but portraying yet another modified embodiment of the invention.

Another well-known desalinization process to which the exchange crystallization technique of the present invention can be applied to advantage relies upon the use of an external refrigerant, such as butane. A system of this type in which the exchange crystallization procedure of the present invention has been incorporated is illustrated in FIGURE 6. Because of the similarity of the system used in FIGURE 6 to that depicted in FIGURE 5, certain identical components which are utilized in both processes have been identified by like reference numerals. In this procedure, liquid butane is mixed with pre-cooled sea water and introduced to the freeze-evaporator unit 134. Here the pressure of the cold mixture (temperature −2° C. to about −4° C.) is reduced to from about 750 to 725 mm. Hg so as to flash the butane to the vapor state and freeze ice crystals from the sea water.

In the conventional external refrigeration process using butane or the like, the flashed vapor is condensed by an external refrigeration system. As thus currently practiced, the butane process has the advantage over the water vapor process which has been described in referring to FIGURE 5 in that the external refrigeration process operates nearer to atmospheric pressure and therefore does not experience the almost insurmountable water vapor load which is generated in the process which utilizes flashing of the sea water to produce water vapor. The external refrigeration process using a relatively low boiling external refrigerant, such as butane, however, still suffers from substantially the same disadvantage of having to handle and wash the ice crystals which are formed.

This difficulty is avoided by combining the "butane process" with the exchange crystallization principle as shown in FIGURE 6. The butane vapor which is generated by flashing in the freeze-evaporator 134 is passed to a condenser 160 where the butane vapors are condensed by the introduction to the condenser of exchange medium. It will be noted that in this procedure the exchange medium, in addition to having the properties hereinbefore described, can be either miscible or immiscible in butane and should have a density which exceeds that of butane.

The case of an exchange medium which is immiscible with butane will first be considered. Upon condensation of the butane vapors, two liquid phases develop in the condenser, with the butane liquid being the upper phase and the liquid of the exchange medium being the lower phase. The butane liquid is then recycled by a suitable pump 162 to the freeze-evaporator unit 134, and the exchange medium is withdrawn from the bottom of the condenser 160 and passed to the slurry chamber 142. A portion of the exchange medium withdrawn from the condenser 160 can be circulated directly into the freeze-evaporator unit 134 so as to aid in the production of ice crystals. This is represented by the dashed line 161. Ice crystals and brine withdrawn from the bottom of the freeze-evaporator unit 134 are introduced to the slurry chamber 142, and are there intimately and directly mixed with the exchange medium.

If the exchange liquid is miscible with the butane, the solution can be taken from the condenser 160, through the pump 162 and flashed in the freeze-evaporator 134, whereby the butane separates from the exchange liquid. The butane vapors leave the top of the freeze-evaporator 134, whereas the slurry of ice, brine and exchange liquid leave the bottom of the freeze-evaporator 134 and enter the slurry chamber 142.

The remaining steps in the process schematically depicted in FIGURE 6 are carried out in a manner identical to the corresponding portion of the process which has been described hereinbefore in referring to FIGURE 5.

The butane-exchange crystallization process schematically illustrated in FIGURE 6 not only presents the advantage of more economical ice washing and conversion to water, but further achieves some economic saving in that the compressor which is normally required to convert the butane vapor to the liquid state preparatory to recycling has been replaced by a liquid pump 162 which consumes less power than the normally required butane vapor pump.

It should be pointed out that where fresh water of very high purity is desired, the ice crystals and exchange medium removed from the settling tank 144 can be directed by a suitable pump to a washing tower where by the use of an intermediate pressure and a small amount of recycled product fresh water, occluded brine can be removed from the ice crystals before they are directed by the high pressure pump 148 to the high pressure exchange crystallization zone 150. This procedure can optionally be used in the processes illustrated by FIGURES 5 and 6, and though the intermediate pressure pump and wash tower are not illustrated, they are similar in construction and function to the pump 27 and tower 25 illustrated in FIGURE 1.

From the foregoing description of the invention, it will be perceived that there are several unique aspects of the proposed process. It is the only desalinization process which takes advantage of the anomalous behavior of water wherein the freezing point decreases with an increase in pressure. Unlike other direct contact freezing processes which involve vaporization and condensation, or exchanges between the liquid and vapor state, of a refrigerant in order to achieve freezing of ice from the sea water, our process involves direct heat exchange between the liquid and a slurry, and entails the process of exchange crystallization. Whereas other freezing processes for the desalinization of sea water may be said to require the separation of the ice as a solid from a liquid at several points in the process, the present invention involves only the separation of two immiscible liquids of sufficiently large density difference to minimize settling times. In effecting such separation of these immiscible liquids, the ice or fresh water, as the case may be, is automatically separated from the brine or exchange medium slurry, as the case may be. The process has the further advantage of removing occluded brine by continuously washing the ice crystals during their formation as a suspension in the exchange liquid. Unlike other freezing processes, it is often not necessary to deaerate the sea water prior to subjecting it to the process, since the naturally entrapped air is usually beneficial in forming small ice crystals which can be stably suspended in the exchange medium to form a pumpable slush.

Although certain specific and preferred embodiments have been described in the foregoing specification in order to provide examples sufficient to enable those skilled in the art to practice the invention easily, it is to be clearly understood that certain changes and innovations can be effected in the depicted apparatus, and in the steps of the process without departure from the basic principles which underlie the invention. An attempt has been made to show several suitable alternatives in the several flow diagrams appearing in the figures as, for example, the inclusion of cyclone separators in some of the flow diagrams, and functionally equivalent separation towers in others of the diagrams. Also, where direct heat exchange is used for pre-cooling the sea water in some instances, indirect heat exchange can be used successfully in most instances. These and other such modifications and innovations as would appear readily to those skilled in the art and would be the functional equivalent of the steps and structures hereinbefore described are deemed to be circumscribed by the spirit and scope of the invention, except as the same may be necessarily limited by the appended claims or reasonable equivalents thereof.

We claim:

1. A process for removing fresh water from an aqueous solution comprising:
   freezing ice crystals from the aqueous solution;
   directly and intimately contacting in a contact zone at a temperature at least as low as the freezing point of the aqueous solution, the aqueous solution and the ice crystals with a liquid exchange medium having the following properties:
   (a) substantial immiscibility in the aqueous solution and in fresh water;
   (b) stable in the presence of, and unreactive with, water and the solute of the aqueous solution to the extent that no irreversible physical or chemical transformations occur during said direct, intimate contact;
   (c) a density less than that of the aqueous solution and fresh water;
   (d) a freezing point at least as low as the freezing point of the aqueous solution at the pressure at which said direct, intimate contact occurs; and
   (e) a positive coefficient of melting temperature versus pressure, $dT/dP$;
   separating a substantial portion of the aqueous solution from the ice crystals and liquid exchange medium using the density difference between said exchange medium and the aqueous solution to effect said separation;
   increasing the pressure on the ice crystals and liquid exchange medium to convert a substantial portion of the ice crystals to fresh water and a portion of the liquid exchange medium to solid particles; and
   separating a substantial portion of the fresh water from the liquid and solid particles of exchange medium, using the density difference between said exchange medium and the fresh water to effect said separation.

2. A process as defined in claim 1 wherein the aqueous solution is saline water.

3. A process as defined in claim 2 wherein the liquid exchange medium is further characterized in having a density less than about 1.025 grams per cubic centimeter and greater than about 0.7 gram per cubic centimeter.

4. A process as defined in claim 2 wherein the exchange liquid has a freezing point at atmospheric pressure in the range of from about 0° C. to about −10° C.

5. A process as defined in claim 2 wherein said exchange medium is selected from the group consisting of animal and vegetable oils and extractions thereof, straight chain organic compounds containing at least 6 carbon atoms, cyclic organic compounds, aromatic organic compounds, ketones, amines, fatty acids and eutectic mixtures of organic compounds.

6. A process as defined in claim 2 wherein said exchange medium is selected from the group consisting of cod liver oil, a eutectic mixture of benzene and naphthalene, a eutectic mixture of pentadecane and benzene, castor oil, menhaden oil, olive oil, while oil, triolein, white mustard seed oil, sesame oil, dolphin oil, dodecane, dodecyne, tridecane, 1,5 hexadiyne, 1-menthone, 1-nonanol, dibutyl ketone, methylheptyl ketone, butanolamine, 2-amino, 1-butanol, p-aminoethylbenzene, tetramethylbenzene, methylcyclohexanol, indene, linoleic acid, caproic acid and o-nitrotoluene.

7. A process as defined in claim 2 wherein said exchange medium is characterized in having a density of from about 0.7 gram per cubic centimeter to about 1.025 grams per cubic centimeter; a freezing point at atmospheric pressure of from about 0° C. to about −10° C., a coefficient of melting temperature versus pressure of at least about 0.015° C./atmosphere and is soluble in the aqueous solution and in water to not more than about 1 weight percent.

8. A process as defined in claim 2 wherein the pressure on the exchange crystals and liquid exchange medium is increased to from about 50 atmospheres to about 250 atmospheres.

9. A process as defined in claim 1 and further characterized to include the step of recycling at least a portion of the exchange medium to said contact zone.

10. A process as defined in claim 1 wherein said ice crystals are frozen from the aqueous solution by contacting the aqueous solution with said exchange medium while said exchange medium is a two phase system containing chemically identical mother liquor and solid particles.

11. A process as defined in claim 1 wherein the coefficient of melting temperature versus pressure, $dT/dP$, of the exchange liquid exceeds about 0.015° C./atmosphere.

12. A process as defined in claim 1 wherein the pressure on the ice crystals and liquid exchange medium is increased by gravitating the ice crystals and exchange medium to a depth in the earth such that a pressure obtains at which the melting point of said exchange medium is higher than that of ice.

13. A process as defined in claim 1 wherein the separated aqueous solution and separated fresh water are passed in heat exchange relation to the raw aqueous solution prior to freezing ice crystals therefrom so that said raw aqueous solution is pre-cooled.

14. A process as defined in claim 1 and further characterized to include the step of passing said exchange medium and fresh water through expanders after separation of the fresh water from the exchange medium to recover a portion of the energy expended in increasing the pressure on the ice crystals and exchange medium.

15. A process as defined in claim 1 wherein the ice crystals are frozen from the aqueous solution by flashing the aqueous solution to a reduced pressure to generate water vapor and a mixture of cold aqueous solution and ice crystals.

16. A process as defined in claim 15 and further characterized to include the steps of
   directly and intimately contacting said water vapor with said exchange medium to condense the water vapor, then separating the water derived from said condensation from said exchange liquid.

17. A process as defined in claim 1 wherein the ice crystals are frozen from the aqueous solution by
   initially mixing the aqueous solution and refrigerant liquid; then
   reducing the pressure on said mixture of aqueous solution and refrigerant liquid to vaporize at least a portion of the refrigerant liquid to freeze ice crystals from the aqueous solution.

18. A process as defined in claim 17 and further characterized to include the steps of
   contacting the refrigerant vapors with said exchange medium to condense the refrigerant liquid, then
   separating the refrigerant liquid from the exchange medium, and
   recycling the separated refrigerant liquid into admixture with the aqueous solution prior to said pressure reduction.

19. A process as defined in claim 1 and further characterized to include the step of melting the outer portion of the ice crystals to remove occluded aqueous solution therefrom, said melting being effected immediately prior to the step of increasing the pressure on the ice crysals and liquid exchange medium to an extent sufficient to convert the ice crystals to fresh water and a portion of the liquid exchange medium to solid particles.

20. A process as defined in claim 19 wherein the melting of the outer portion of the ice crystals is effected by increasing the pressure on the ice crystals and exchange medium to a pressure less than that required to convert substantially all of the ice crystals to fresh water and simultaneously convert a portion of the exchange medium to solid particles.

21. A process for treating an aqueous solution to concentrate the solute by removing relatively pure water therefrom comprising:
   admitting into direct contact with the aqueous solution after it has been pre-cooled to near its freezing point, a two phase exchange medium including a liquid and solid particles of qualitatively identical chemical composition to the liquid slurried in the liquid, said liquid having the following properties:
      (a) substantial immiscibility in the aqueous solution and fresh water;
      (b) stable in the presence of, and unreactive with, water and the solute of the aqueous solution to the extent that no irreversible physical or chemical transformations occur during said direct contact;
      (c) a density less than that of the aqueous solution and fresh water;
      (d) a freezing point at least as low as the freezing point of water at the pressure at which said direct contact occurs; and
      (e) a positive coefficient of melting temperature versus pressure, $dT/dP$,
   said exchange medium being admitted at a temperature below the freezing point of water and at least as high as its own freezing point whereby exchange crystallization occurs and water is frozen from the aqueous solution as ice particles while at least a portion of the solid particles of the exchange medium are melted and absorb their latent heat of fusion;
   separating a substantial portion of the aqueous solution from the ice particles and exchange medium using the density difference between said exchange medium and the aqueous solution to effect said separation;
   increasing the pressure on the ice particles and liquid exchange medium to convert a substantial portion of the ice crystals to fresh water and a portion of the exchange medium to solid particles;
   separating a substantial portion of the fresh water from the liquid and solid particles of exchange medium, using the density difference between said exchange medium and the fresh water to effect said separation; and
   recycling at least a portion of said exchange medium as two phases including liquid and solid particles to the zone of initial direct contact between said pre-cooled aqueous solution and said two phase exchange medium.

22. A process for recovering fresh water from a saline aqueous solution comprising:
   pre-cooling said saline solution to a temperature slightly above the initial freezing point of the saline solution;
   directly and intimately contacting at about atmospheric pressure and at a temperature substantially the same as the temperature of the adjacent environment, said pre-cooled saline solution with an exchange medium in the form of a slurry comprising solid particles and liquid of identical composition, said exchange medium having a density of from about 0.7 gram per cubic centimeter to about 1.025 grams per cubic centimeter, a freezing point at atmospheric pressure of from about 0° C. to about −10° C. and lower than that of said saline solution, a coefficient of melting temperature versus pressure of at least about 0.015° C./atmosphere, a solubility in said saline solution and in water not exceeding 1 weight percent, and being stable in the presence of, and unreactive with, water and salt;
   agitating and retaining said pre-cooled saline solution and exchange medium in contact with each other for a period of time sufficient to freeze ice particles from the saline solution and convert at least a portion of the solid particles of said exchange medium to liquid;
   separating substantially all of the exchange medium and ice particles from the saline solution;
   increasing the pressure on the separated exchange medium and ice particles to from about 50 atmospheres to about 250 atmospheres while said ice particles are in direct, intimate contact with said exchange medium to convert a major portion of said ice particles to water having a reduced salt content and a portion of the liquid phase of said exchange medium to solid particles; then
   separating the water from said exchange medium.

23. The process defined in claim 22 and further characterized to include the steps of
   increasing the pressure on said separated exchange medium and ice particles to a pressure of from about 10 atmospheres to about 100 atmospheres prior to increasing the pressure thereon to a higher pressure in the range of from about 50 atmospheres to about 250 atmospheres; and
   simultaneously moving fresh water of low salt content countercurrent through said exchange medium and ice particles and in direct contact therewith whereby the increase in pressure and fresh water washing removes occluded brine from said ice particles; then
   separating the fresh water used in said countercurrent washing from said washed ice particles and exchange medium prior to increasing the pressure on the ice crystals and exchange medium to from about 50 atmospheres to about 250 atmospheres.

24. The process defined in claim 23 wherein a portion of the water separated from said exchange medium as the final step in claim 20 is recycled and used in the countercurrent washing step described in claim 23.

25. The process defined in claim 23 wherein said pressure increase is accomplished by gravitating the exchange medium and ice particles downwardly in the earth.

26. The process defined in claim 22 wherein, after separating the water from the exchange medium in the last step set forth in claim 22, the thus separated exchange medium is recycled into direct, intimate contact with said pre-cooled saline solution at atmospheric pressure.

27. The process defined in claim 22 wherein the saline aqueous solution is pre-cooled by indirect heat exchange with saline solution and water separated from the exchange medium during the process.

References Cited

UNITED STATES PATENTS

| | | | |
|---|---|---|---|
| 2,904,511 | 9/1959 | Donath | 210—67 X |
| 3,119,772 | 1/1964 | Hess et al. | 210—205 X |
| 3,214,371 | 10/1965 | Tuwiner | 210—60 |
| 3,354,083 | 11/1967 | Cheng et al. | 210—59 |

OTHER REFERENCES

Barduhn, Allen J.: The Freezing Processes For Water Conversion. In First International Synaposium on Water Desalinization, Bulletin SW 9/88, U.S. Dept. of The Interior, Oct. 3–9, 1965.

REUBEN FRIEDMAN, *Primary Examiner.*

J. ADEE, *Assistant Examiner.*

UNITED STATES PATENT OFFICE
CERTIFICATE OF CORRECTION

Patent No. 3,399,538                              September 3, 1968

Cedomir M. Sliepcevich et al.

It is certified that error appears in the above identified patent and that said Letters Patent are hereby corrected as shown below:

Column 6, line 31, "$\Delta A$" should read -- $\Delta V$ --; line 44, "no" should read -- not --. Column 7, line 31, "diagham" should read -- diagram --. Column 18, line 13, before "a eutectic" insert -- a eutectic mixture of cyclohexane and naphthalene, --; line 14, "while" should read -- whale --.

Signed and sealed this 27th day of January 1970.

(SEAL)
Attest:

Edward M. Fletcher, Jr.                      WILLIAM E. SCHUYLER, JR.
Attesting Officer                                Commissioner of Patents